United States Patent
Sameshima et al.

(10) Patent No.: US 7,228,561 B2
(45) Date of Patent: Jun. 5, 2007

(54) OPEN INFORMATION BASED ACCESS CONTROL METHOD

(75) Inventors: Shigetoshi Sameshima, Machida (JP); Katsumi Kawano, Kawasaki (JP); Motohisa Funabashi, Machida (JP); Nobuhisa Kobayashi, Hitachinaka (JP); Toshihiko Nakano, Tokai (JP)

(73) Assignee: Hitachi, Ltd., Tokyo (JP)

( * ) Notice: Subject to any disclaimer, the term of this patent is extended or adjusted under 35 U.S.C. 154(b) by 783 days.

(21) Appl. No.: 10/109,896

(22) Filed: Apr. 1, 2002

(65) Prior Publication Data

US 2002/0147509 A1    Oct. 10, 2002

(30) Foreign Application Priority Data

Apr. 4, 2001 (JP) ............................ 2001-105369

(51) Int. Cl.
G04L 9/32 (2006.01)
G06F 15/16 (2006.01)
G06F 15/173 (2006.01)
G06F 17/30 (2006.01)

(52) U.S. Cl. .................... 726/2; 726/4; 726/21
(58) Field of Classification Search ................ 726/2–4, 726/21; 709/225, 231
See application file for complete search history.

(56) References Cited

U.S. PATENT DOCUMENTS

| 5,341,375 | A | * | 8/1994 | Buchholz et al. ........... 370/349 |
| 5,862,480 | A | * | 1/1999 | Wild et al. ............... 455/432.2 |
| 6,286,004 | B1 | * | 9/2001 | Yoshiura et al. ............ 707/10 |
| 6,286,523 | B1 | * | 9/2001 | Wilson et al. ............... 134/80 |
| 6,772,209 | B1 | * | 8/2004 | Chernock et al. ........... 709/225 |
| 6,785,287 | B1 | * | 8/2004 | Honkala et al. ............ 370/401 |
| 2001/0031013 | A1 | * | 10/2001 | Stetzler et al. ............. 375/259 |
| 2002/0010789 | A1 | * | 1/2002 | Lord .......................... 709/231 |

FOREIGN PATENT DOCUMENTS

JP    2000163617    6/2000

OTHER PUBLICATIONS

D. G. Messerschmitt, "Understanding Networked Applications", pp. 517-538.
"Security Service Specification", Version 1.7, Object Management Group, Inc., Mar. 2001, pp. 1-1 to 3-118.

* cited by examiner

Primary Examiner—Emmanuel L. Moise
Assistant Examiner—Minh Dieu Nguyen
(74) Attorney, Agent, or Firm—Mattingly, Stanger, Malur & Brundidge, P.C.

(57) ABSTRACT

In distributed system for operating devices in association with one another, a device responsible for determining whether or not an access is permitted, and criteria for determination are hidden from accessing device or user, and flexible access control is provided among devices without need for previously defining accessible devices or user's identifiers. Communication process opens data communications which are interactions between devices to permit indefinite number of other devices to monitor data. A behavior monitoring process acquires interaction within particular device or between other devices in system for storage in behavior log table. Access control process matches the behavior log table with access control policy to determine whether or not device should be associated with target device from which process request is received, or with a target device to which a process program of the particular device attempts to access.

8 Claims, 9 Drawing Sheets

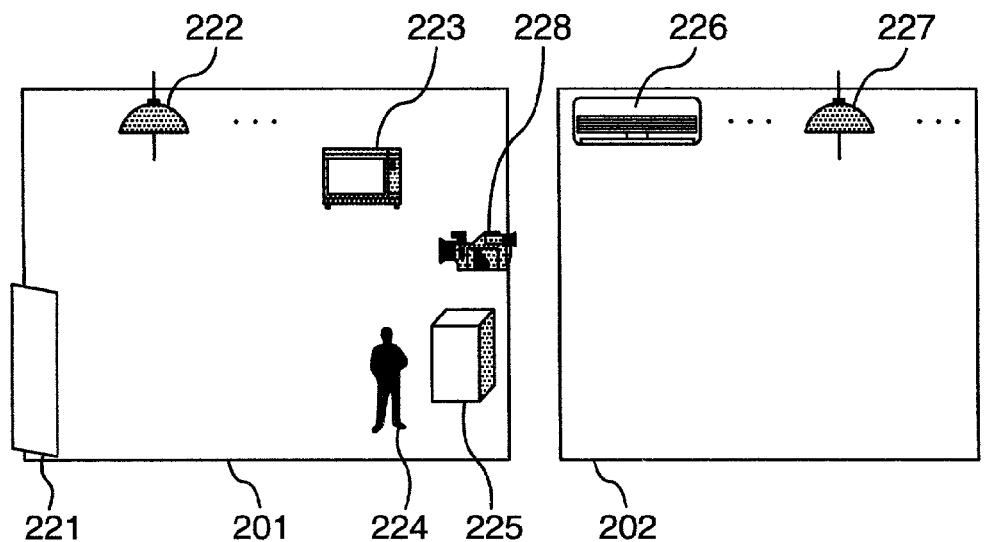

FIG. 4

| TARGET DEVICE | TYPE | DETERMINATION ORDER | |
|---|---|---|---|
| * | EQ | DOOR:11,LIGHT:21,SB:31 | ~421 |
| | | | ~422 |
| | | | ~423 |

FIG. 6

| HEADER | DESTINATION | SOURCE | MESSAGE IDENTIFIER | DATA |
|---|---|---|---|---|

| TARGET DEVICE | TYPE | DETERMINATION CONTENT | |
|---|---|---|---|
| * | N-EQ | <TARGET DEVICE>  MON:11<br><PROCESS>  stop>0<br><TARGET DEVICE>  SB:31<br><PROCESS>  open | ~721 |
|  |  |  | ~722 |
|  |  |  | ~723 |

| SOURCE DEVICE | DESTINATION DEVICE | REQUESTED PROCESS | DATA | |
|---|---|---|---|---|
| DOOR:11 | *1 | COS_Notify | Opened | ~921 |
| LIGHT:21 | *1 | COS_Notify | ON | ~922 |
| DOOR:11 | *1 | COS_Notify | Locked | ~923 |
| TV:11 | *1 | SHUTDOWN |  | ~924 |

| TARGET DEVICE | TYPE | DETERMINATION CONTENT | |
|---|---|---|---|
| * | EQ | <SOURCE DEVICE> DOOR:11<br><PROCESS> COS_Notify=Opened<br><SOURCE DEVICE> DOOR:11<br><PROCESS> COS_Notify=Locked | ~1021 |
|  |  |  | ~1022 |
|  |  |  | ~1023 |

1011 1012 1013

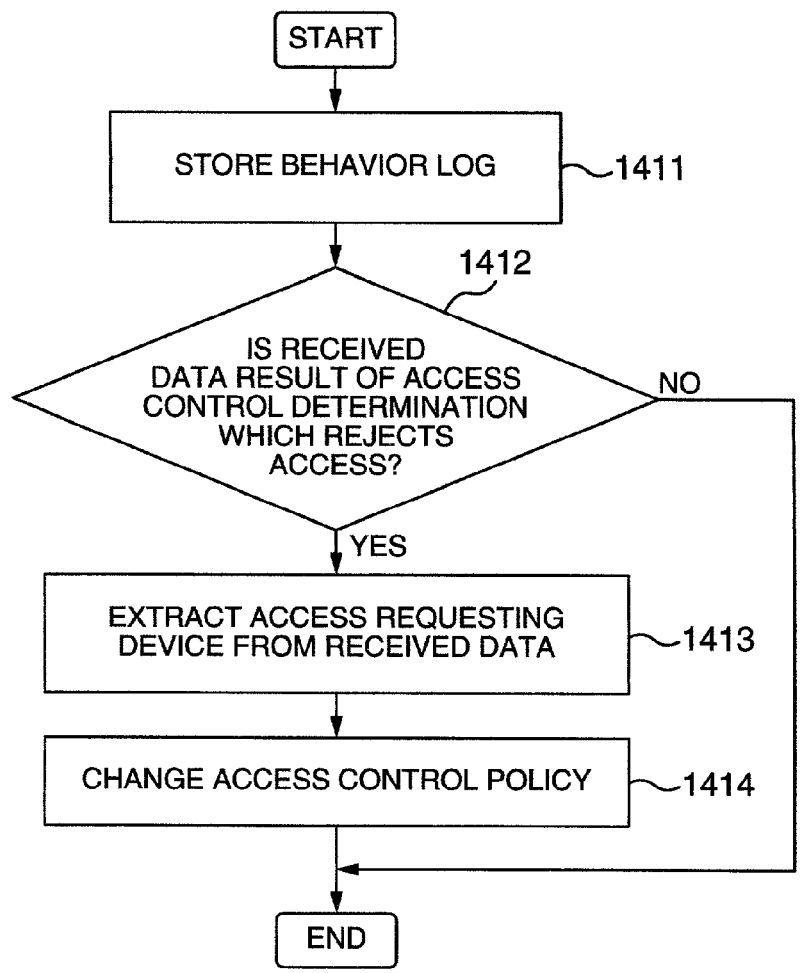

OPEN INFORMATION BASED ACCESS CONTROL METHOD

BACKGROUND OF THE INVENTION

The present invention relates to a distributed system for operating devices having incorporated therein one or a plurality of processors each having a function of preserving data, a function of processing a program, and a communication function such that the devices are association with one another. Particularly, the present invention relates to a method of mutually opening data communicated between devices, which have a function of communicating data with one another and a function of arbitrarily executing a programs, to determine whether or not the devices should be associated with one another. The method is particular suitable for applications in control systems such as a building/home automation system, social systems such as plant control, manufacturing, distribution and the like, traffic systems, and the like.

In step with the advanced downsizing associated with the trend of higher performance and higher density of semiconductor devices, processors having calculating capabilities no longer reside only in dedicated computers but are increasingly incorporated in any devices. Further, as represented by the Internet, means are gradually arranged for communications with computer systems through these devices. When such devices having communication capabilities are associatively operated with one another, an access control list, for example, is used in a method for authenticating a target device. This method involves comparing an identifier of an associated target device or a user identifier entered by the user of the target device with the access control list stored in a particular device to determine whether or not the two devices should be associated with each other. Also, for association through a plurality of devices, a method such as "Delegation" is used for integrating the results of authentications for the plurality of devices. These techniques are described, for example, in "CORBA Security Service—Outline and Implementation," UNISYS Technical Report, No. 55.

According to the foregoing prior art, respective devices must have been previously defined as an accessible device or an inaccessible device in the access control list. In other words, assuming a target device or user, an access right must have been previously determined therefor. However, since users can readily know where exists information which is the basis for the determination, the information is susceptible to attacks such as tampering. Also, from a viewpoint of operation, in an environment which includes a large number of devices that can change in configuration over time, the aforementioned method based on the previous definition has limitations in previously assuming all devices, thus giving rise to a problem that flexible association cannot be provided for new devices. Otherwise, the access control list must be defined again in conformity to changes in the configuration of devices, causing additional labor and time. Moreover, another problem arises when a device is changed in performance or content of processing performed thereby, where after the device has been authenticated only with its identifier, a malfunction of the device will affect the association.

SUMMARY OF THE INVENTION

It is an object of the invention to hide a device responsible for determining whether or not an access is permitted, and the criteria for the determination from an access requesting device or a user, and to provide a flexible access control among devices without the need for previously defining accessible devices or user's identifiers.

An information device according to the present invention includes means for opening interactions between devices (communicated data, requests for processing, and results of the requests) to other devices such that a plurality of devices participate in determining whether or not an access to a certain device is permitted, in order to hide the determination on the access control for a device from an access requesting device, thereby making it difficult to identify a device responsible for determining the access control from an access requesting device. The term "open" used herein includes presentation of information. The opening also includes transmission of data. The term "open" further includes permission of an access when another device accesses information possessed by the information device.

The information device of the present invention further includes means for determining whether or not the information device should be associated with a certain device using the log of opened interactions. The information device recognizes behaviors of a certain device in a system as well as a statically defined identifier of the device, and makes the foregoing determination using the recognized behaviors. The term "association" used herein includes execution of a predetermined function by a plurality of devices.

BRIEF DESCRIPTION OF THE DRAWINGS

FIG. 2 is a diagram illustrating an exemplary configuration of a system in a second embodiment of the present invention;

FIG. 3 is a diagram showing an exemplary structure of a behavior log table in the second embodiment of the present invention;

FIG. 4 is a diagram showing an exemplary configuration of an access control policy in the second embodiment of the present invention;

FIG. 6 is a diagram showing an exemplary structure of message data communicated among devices by a communication process of the present invention;

FIG. 9 is a diagram showing an exemplary structure of a behavior log table in a fourth embodiment of the present invention;

FIG. 10 is a diagram showing an exemplary configuration of an access control policy in the fourth embodiment of the present invention;

FIG. 14 is a flow diagram illustrating a behavior monitoring process in a fifth embodiment of the present invention; and FIG. 15 is a diagram showing an exemplary setting for an access control policy in the fifth embodiment of the present invention.

DETAILED DESCRIPTION OF THE EMBODIMENTS

In the following, several embodiments of the present invention will be described with reference to the accompanying drawings. Particularly, a method of opening an interaction which is a communication of data between devices to hide a device responsible for determining the accessibility will be described in connection with the following examples.

(1) A method for each device to accept only multicasted data (request).

Next, the following examples will be described for a method of recognizing an opened interaction between devices, which is a behavior of a certain device in a system, for controlling the accessibility to hide the criteria for the accessibility.

(2) A method by which a certain device monitors an interaction of a target device subjected to the access control to another device to determine the accessibility based on the order in which devices are involved in the interaction.

(3) A method by which a certain device monitors a log of processes requested from a target device subjected to the access control to determine the accessibility based on the log of process results.

(4) A method by which a certain device monitors the status of other devices to indirectly estimate a behavior of a target device subjected to the access control to determine the accessibility.

Further, the following example will be described for a case of updating an access control policy of a particular device using the result of access control in another device.

(5) A method by which a certain device uses the result of access control in another device to change the policy so as to reject an access from a device which has performed a fraudulent behavior.

Figure 1:
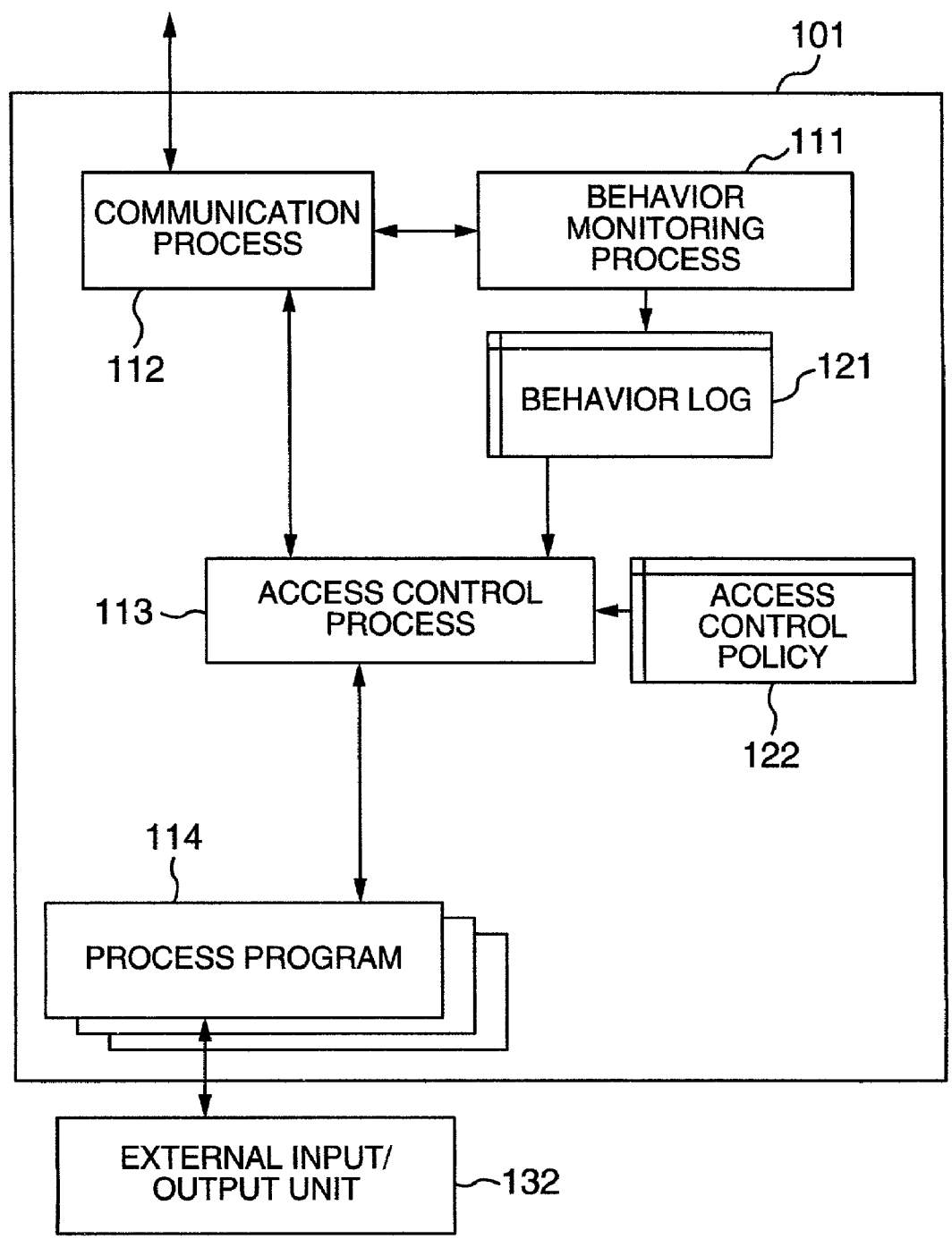
FIG. 1 is a block diagram illustrating an exemplary configuration of a device to which the present invention is applied.

FIG. 1 illustrates an exemplary configuration of a device 101 to which the present invention is applied. Processes within the device 101 includes a behavior monitoring process 111 for monitoring data communicated between a process program 114 in the device 101 and a process program in another device or between process programs in other devices; a communication process 112 for communicating data to and from another device; an access control process 113 for authenticating a target with which the device 101 is associated; and the process program 114 for controlling the device 101. The behavior monitoring process 111 receives data generated in the device 101 itself or transmitted from another device through the communication process 112 to monitor the operation of an associatively operating device and process program within a system. The monitoring includes the reception or generation of information indicating which action the process program is executing (or is forcing a device to execute). Monitored communication data is stored in a behavior log 121. The access control process 113 matches an authentication policy 122 with behaviors of other devices acquired from the behavior log 121 to authenticate a target device with which the device 101 is associated.

The process program 114 controls information inputted and outputted through an external input/output unit 132, as well as controls devices. The external input/output unit used herein may be a device such as a sensor, an actuator or the like controlled by the process program 114, or a device which has a function of controlling the process program 114 executed on a device and referencing output values through a man-machine interface such as a liquid crystal display, a touch panel or the like. However, the foregoing is not essential, and some device may not have the external input/output unit 132.

The process program 114 transmits data to a process program in another device and acquires data from the process program in the other device through the communication process 112 for associative operation with this device. In this event, data transmitted and received between the process programs can be acquired from another arbitrary device using a method such as a broadcast communication which will be shown in a first embodiment of the present invention.

FIG. 6 shows an exemplary structure of message data communicated among devices by the communication process 112. A message is comprised of fields labeled header 611, destination 612, source 613, message identifier 614, and data 615. The header 611 stores a variety of flags for the communication process 112. The destination 612 stores an identifier of a destination device of the message, or stores an identifier indicative of a network address or a communication range such as a multicast group when using a broadcast communication for broadcasting the message to a plurality of devices. The source 613 stores an identifier of a source device of the message. The message identifier 614 stores contents of message data, and an identifier of a process which is called in a destination device, and used for determining a process program called in a device which receives the message. The data 615 is passed to the called process program which then processes the data.

(First Embodiment)

Figure 12:
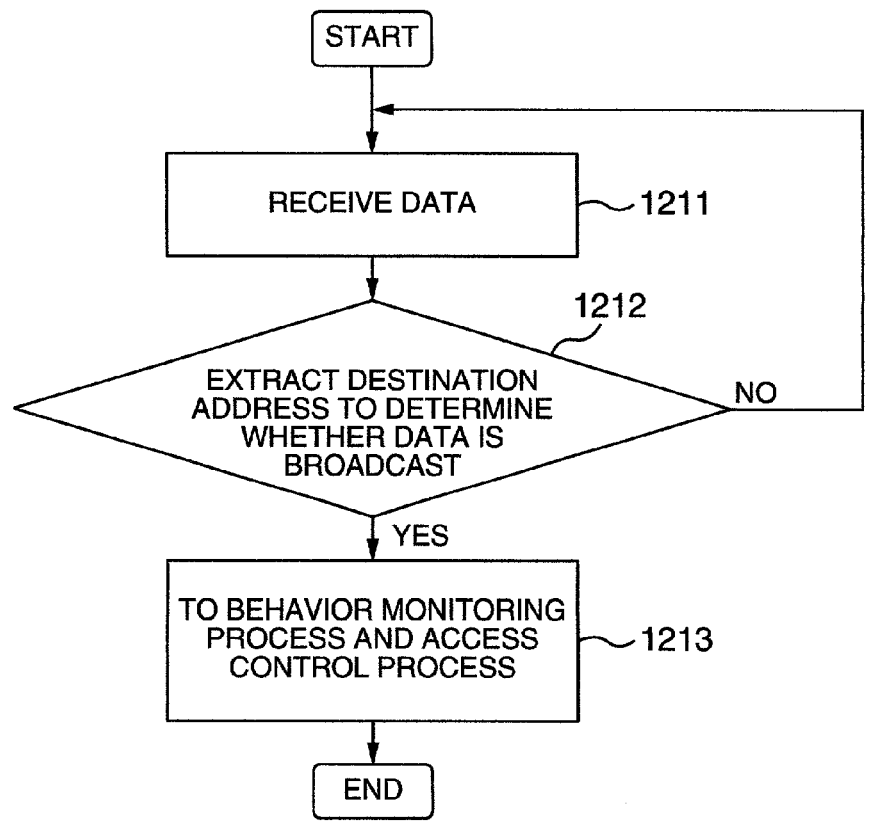
FIG. 12 is a flow diagram illustrating a flow diagram illustrating the communication process in the first embodiment of the present invention.

FIG. 12 is a flow diagram illustrating the communication process 112 in the first embodiment of the present invention. First, the device 101 waits for arrival of data (step 1211). Next, upon receipt of data, the communication process 112 extracts the destination 612 from the received data to determine whether or not an address is specified in the destination 612 for broadcasting the data to another device (step 1212), for example by a broadcast-address or multicast-address. If no address is specified for broadcasting, the received data is discarded, and the device 101 again waits for data. Conversely, if the data is broadcast, the communication process 112 passes the received data to the behavior monitoring process 111 and access control process 113 (step 1213).

While the foregoing embodiment has shown an example in which the device 101 receives broadcast data, the device 101 may receive data on a one-to-one communication basis. In this case, the communication process 112 determines at step 1212 that the data is not broadcast, and forwards the data received by the device 101 to another device through broadcast communication to open the data.

Figure 13:
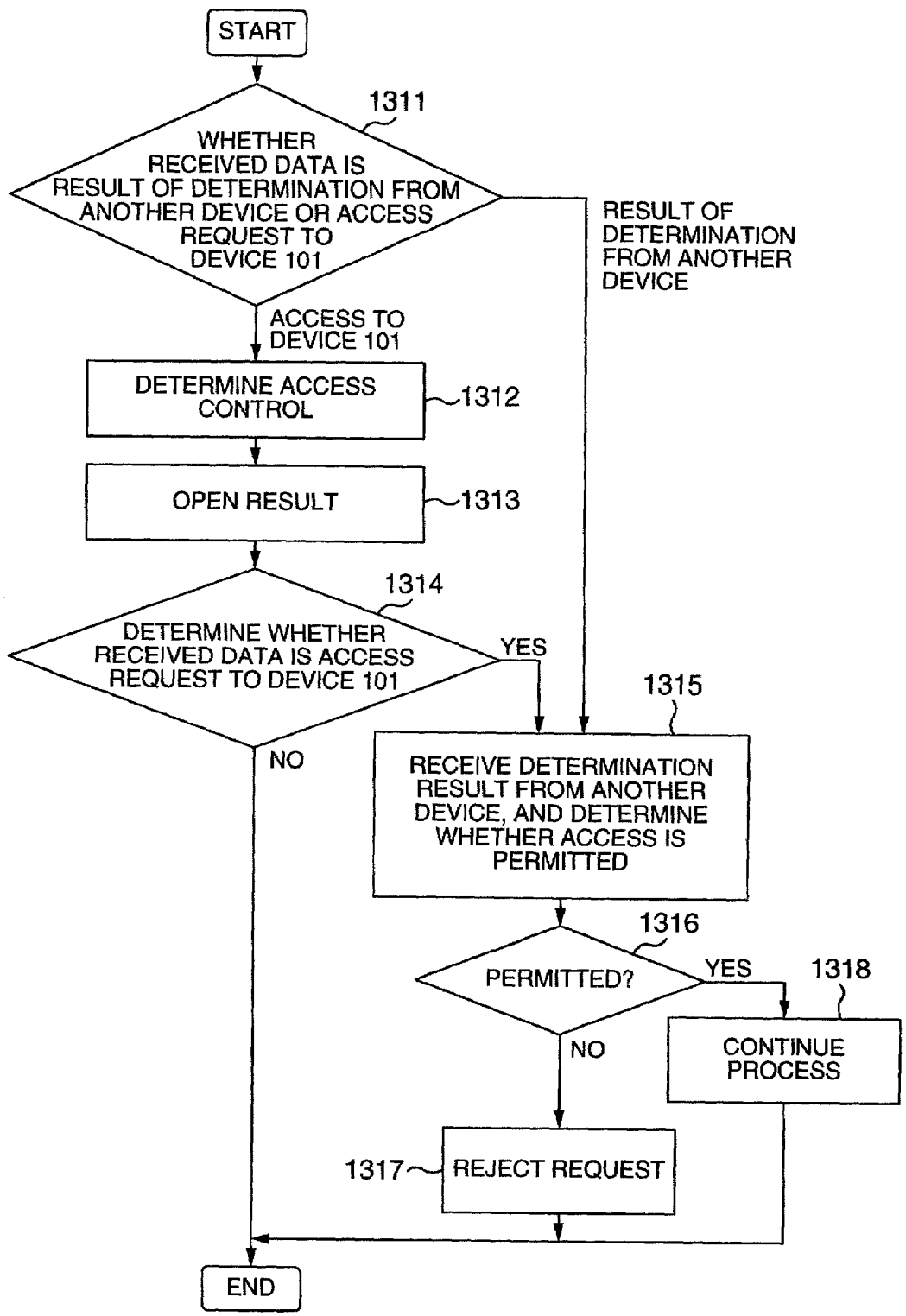
FIG. 13 is a flow diagram illustrating the access control process in the first embodiment of the present invention.

FIG. 13 is a flow diagram illustrating the access control process 113 in the first embodiment of the present invention. The access control process 113 receives data from the communication process 112, and determines whether the data is the result of determination from another device or an access request to the device 101 (step 1311). If the data does not show the result of determination, i.e., if the data shows an access request to an arbitrary device, the access control process 113 determines whether or not the access is permitted using information on the target device (step 1312), and opens the result of the determination at step 1312 to other devices (step 1313). Here, the determination as to whether or not the access is permitted can be made using the access control list as previously described in connection with the prior art, or by querying an authentication authority to authenticate the target device, or the like. Alternatively, the target device may be monitored by accumulating the access log. In this case, the determination may not be made as to whether or not an access is permitted. Further alternatively, the access control process 113 may determine that an access is permitted. In addition, the result of determination may be opened to all devices since a device responsible for the authentication is hidden in the determined result. Alternatively, the result of determination may not be opened in some of devices.

Next, the access control process 113 determines whether or not the data received from the communication process 112 is an access request to the device 101 itself (step 1314), and terminates if the data is not an access request to the device 101, and waits for the determination as to whether or not the access is permitted if the data is an access request (step 1315). At step 1315, the access control process 113 determines whether or not the access to the device 101 is permitted based on the opened result determined at steps 1312 and 1313 in other devices and received at step 1311, in addition to the result of determination in the device 101 itself. The determination at step 1315 may be made on a majority basis, or may be made such that the access is permitted unless the access control process 113 receives the result of determination indicative of access rejection within a fixed time period. The access control process 113 determines from the result of determination at step 1315 whether or not the access is permitted (step 1316). The access control process 113 passes the data to the process program 114 when it permits the access (step 1318), and rejects the request from the access requesting device when it does not permit the access (step 1317).

According to the foregoing embodiment, access requesting data is also opened to devices other than to a device to which an access is requested. In addition, since the determination as to whether or not the access is permitted is also opened, an access requesting device hardly finds a device which determines the permission for the access. Therefore, even if a fraudulent access is attempted, the access control list is hardly located, so that it is prevented from being tampered. Further, since any access is opened, any anonymous device can monitor a fraudulent access for its progress and details, so that it is difficult to tamper the access log to destruct the evidence. The access list may be fully opened.

(Second Embodiment)

FIG. 2 is a diagram illustrating an exemplary configuration of a system in a second embodiment of the present invention. A room 201 is provided with a door 221, an illumination 222, a television 223, and a cashbox 225, while a room 202 is provided with an air conditioner 226, an illumination 227, and a monitoring device 228. In addition, a user holds a portable terminal 224. Here, the facilities 221–228, which are equipped with the device according to the present invention, associatively operate with one another by mutually communicating data through a communication medium such as a wireless medium, and any arbitrary device can monitor a data communication log among the devices.

FIG. 3 shows an exemplary structure of a behavior log table in the second embodiment of the present invention. The behavior log table is comprised of fields labeled source device 311, destination device 312, requested process 313, and data 314. A device responsible for access control acquires message data communicated among devices from the communication process 112, and stores the source and destination of the message data in the fields 311, 312, respectively, and stores data which serve as an identifier and a parameter of a process requested by the message data in the fields 313, 314, respectively. Here, a record may be stored for each received data. Alternatively, when a monitored device has been determined from a policy described in connection with FIG. 4, message data destined to or originated from the device may be selected for storage. In this case, only message data many be selected.

FIG. 4 is a diagram showing an exemplary configuration of an access control policy in the second embodiment of the present invention. The access control policy is comprised of fields labeled target device 411, type 512, and determination order 413. The target device 411 stores an identifier of a target device for which the access control is conducted. The type 412 is a field indicative of the criteria for the determination order 413, and stores the criteria such as whether or not complete matching is required, whether or not an access may be made to another device in the middle if the order is the same, and the like. The matching of order may be determined only in consideration of matching of order. The determination order 413 stores an order of devices which are used in the determination. Here, a record 421 shows an exemplary configuration of the access control policy for the cashbox 225 (device "SB:31"). Here, the record 421 defines that an arbitrary device (specified by "*") to be associated must have accessed a device "DOOR:11" and a device "LIGHT:21" before accessing to the cashbox 225, and that the access order with other devices must completely match ("EQ"). This means, for example, that the access to the cashbox 225 is permitted if the user enters the room from the door, turns on the illumination, and accesses to the cashbox, and that the access to the cashbox 225 is not permitted if the user does not pass an authorized path, for example, if the user enters the room from another access route.

Figure 5:
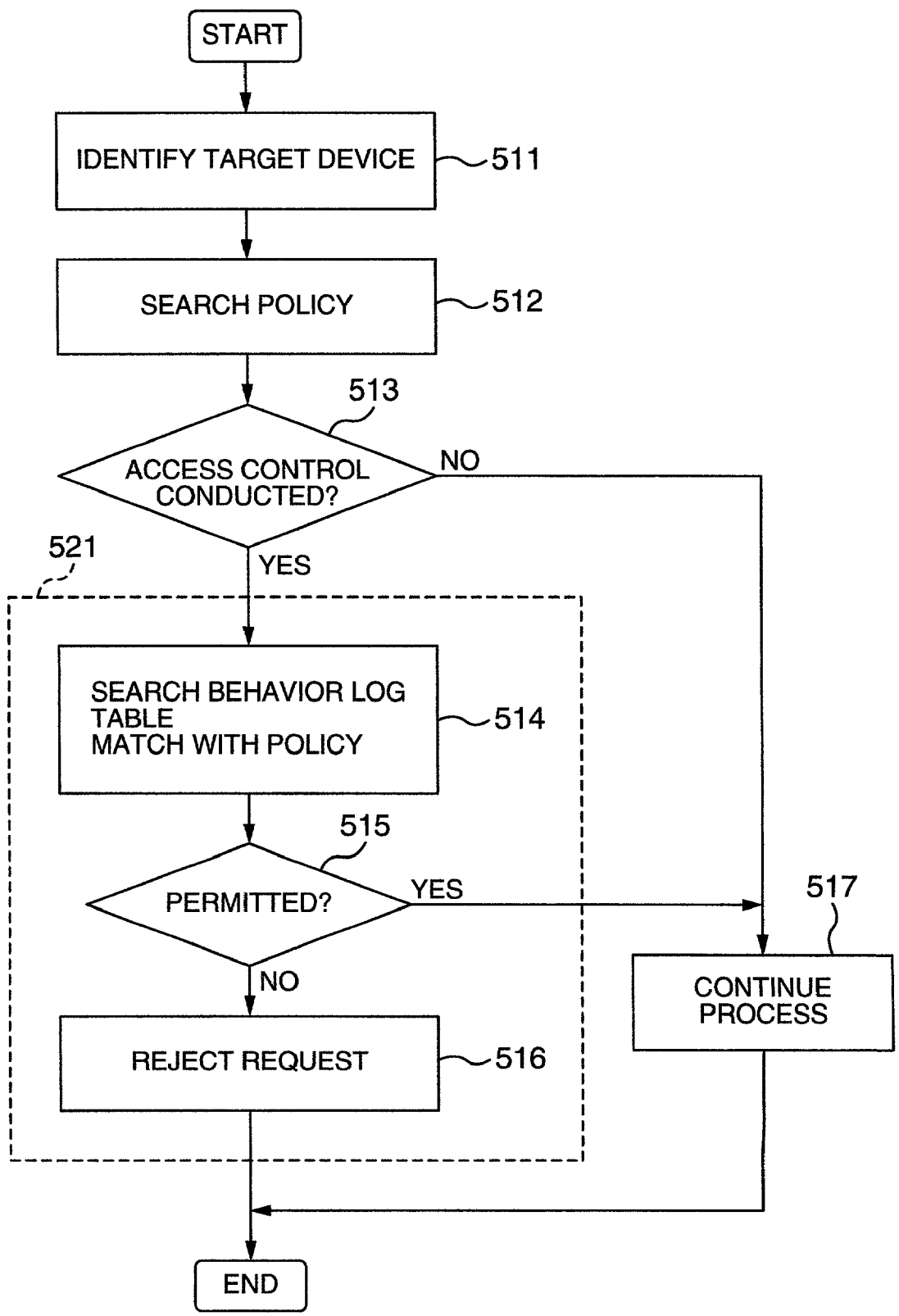
FIG. 5 is a flow diagram illustrating an access control process in the second embodiment of the present invention.

FIG. 5 is a flow diagram illustrating the access control process 113 in the second embodiment of the present invention. The access control process 113 receives an access request to the process program 114 of a particular device from another device, or an access request to another device from the process program 114 of the particular device (step 511), and searches the policy to see whether or not the particular device is set to control an access to the pertinent other device (step 512). Here, the access control process 113 determines whether or not the other device has been registered in the target device 411 of the policy (step 513), and searches the behavior log table when registered to acquire the log of other devices accessed by the pertinent other device for matching with the policy (step 514). The access control process 113 determines whether or not the access is permitted using the type of policy and the determination order (step 515), and rejects the access request if the access is not permitted (step 516). If the particular device is not set to control accesses to the pertinent device at step 513, or if the access is permitted at step 515, the process continues (step 517). Specifically, when the access control process 113 determines a process request from the process program 114 of the particular device to another device, the access control process 113 passes the request to the communication process 112. When the access control process 113 determines a process request from a process program of another device to the process program 114 of the particular device, the access control process 113 passes the request to the process program 114 which is responsible for the request.

While the second embodiment has shown an example in which each device actively monitors the log of each device which has accessed other devices, each device may actively monitor indirectly behaviors of devices which have not accessed other devices, using, for example, a means as described in "ID System and Applied Cases," Factory Automation, pp. 51–57, February 1995. In an example illustrated in FIG. 8, a reader 812 recognizes a tag 811 given to a user, and a device 813, embodying the present invention, connected to the reader 812 virtually transmits a message to other devices as if the device 813 was accessed by the tag 811. Such a method can indirectly open the behavior of the tag 811 to other devices. Also, while the second embodiment has shown an example of access control process in a device which receives an access request or a device which issues an access request, an access control server may be installed for making the determination as to whether or not an access is permitted.

By using such access control, flexible access control can be conducted with devices which have not been originally supposed, without previously defining devices accessible to an intended device and devices not accessible to the intended device. In addition, since the access control is conducted using the log of accesses among devices, it is difficult to find out which determination is made. Further, since accesses with a plurality of devices are used as the criteria, the access control can be readily used in multiple stages.

(Third Embodiment)

Figures 7, 8:
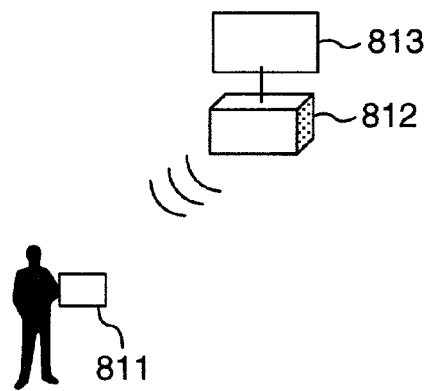
FIG. 7 is a diagram showing an exemplary configuration of an access control policy in a third embodiment of the present invention.
FIG. 8 is a diagram illustrating an exemplary configuration of a system when a behavior of a device is indirectly monitored in the second embodiment of the present invention.

FIG. 7 is a diagram showing an exemplary configuration of an access control policy in a third embodiment of the present invention. The access control policy is comprised of fields labeled target device 711, type 712, and determination criterion 713. The target device 711 stores an identifier of a target device subjected to the access control, and the type 712 is a field indicative of the criteria, as is the case with the example which has been described in the first embodiment of the present invention. The determination content 713 is a field for storing a device for use in the determination, a requested process, and conditions for data.

Here, a record 712 shows an exemplary configuration of the access control policy for a cashbox 255 (device "SB: 31"). The record 712 specifies that when an arbitrary device to be associated (specified by "*") accesses a process "stop" of a monitoring camera "MON:11" before accessing the cashbox 255, with the result of the process being true, i.e., successful, and subsequently accesses a process "open" of the cashbox 255 "SB:31," the process is not permitted ("N-EQ"). This means, for example, that an access to the cashbox 225 is permitted when the user accesses the cashbox with the monitoring camera left turned on, whereas an access to the cashbox 225 is not permitted when the user intends to access the cashbox after he intentionally turns off the monitoring camera. It also means that an access to the cashbox is permitted if the user cannot turn off the monitoring camera for some reason.

By using the access control policy shown in FIG. 7, the behavior log table shown in FIG. 3, and the access control process shown in FIG. 5, accesses among devices can be meticulously controlled based on the behavior of the devices. By using such access control, flexible access control can be conducted with devices which have not been originally supposed, without previously defining devices accessible to an intended device and devices not accessible to the intended device. In addition, since accesses with a plurality of devices are used as the criteria, in addition to the fact that the access control is conducted using accesses among devices, the access control can be readily used in multiple stages. Further, it is possible to determine whether or not an access between devices is permitted even when the access is made through a multicast communication which does not specify a target device.

(Fourth Embodiment)

FIG. 9 is a diagram showing an exemplary structure of a behavior log table in a fourth embodiment of the present invention. In the fourth embodiment, the behavior log table is comprised of fields labeled source device 911, destination device 912, requested process 913, and data 914. Records 921–924 show examples of stored behavior log. The record 921 shows that the contents of a state changing event ("COS_Notify") broadcast ("*") from a device "DOOR:11" to another device belonging to a multicast group 1 is "Opened." Similarly, the record 922 shows a state changing event "ON" broadcast from a device "LIGHT:21" to the multicast group 1, and the record 923 shows a state changing event "Locked" broadcast from the device "DOOR:11" to the multicast group 1, respectively. The record 924 in turn shows that a device "TV:11" is shut down ("SHUT-DOWN"). Such a shut-down device may be notified from the device to other devices, or the state of each device may be detected by another device using a method such as polling. The state includes information indicative of the operation of the device (what type of process the device is executing).

The behavior log shown herein may not be a log of accesses made from a certain device to other devices through the communication process. Specifically, physical switching on/off or a process program of each device may detect a physical external change through the external input/output unit 132 and broadcast the physical external change to other devices. The fourth embodiment shows an example in which the behaviors of peripheral devices are estimated using such physical changes to control accesses to these devices.

FIG. 10 shows an exemplary configuration of an access control policy in the fourth embodiment of the present invention. In the fourth embodiment, the access control policy is comprised of fields labeled target device 1011, type 1012, and determination content 1013. As in the first and second embodiments of the present invention, the target device 1011 and type 1012 are field for indicating an identifier of a target device subjected to the access control, and the criteria for determination, respectively. The determination content 1013 is a field for storing determination conditions for devices and message data for determining the access control.

Here, a record 1021 shows an exemplary configuration of the access control policy for a cash box 225 (device "SB: 31"). The record 1021 specifies that when an arbitrary device to be associated (specified by "*") accesses the cash box 225, a door "DOOR:11" is opened ("COS_Notify=Opened"), and when the door "DOOR:11" is locked afterwards ("COS_Notify=Locked"), an access to the cash box 225 is permitted ("EQ"). This means, for example, that an access to the cash box 225 is permitted when the user attempts to access the cashbox while the door is left opened in order to prevent the door from being locked.

Figure 11:
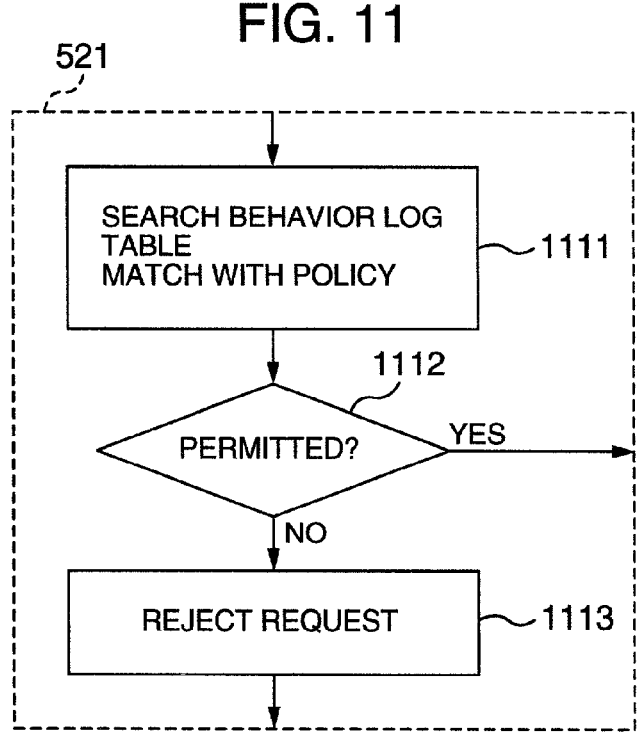
FIG. 11 is a flow diagram illustrating the access control process in the fourth embodiment of the present invention.

FIG. 11 is a flow diagram illustrating a routine 521 in the access control process in the fourth embodiment of the present invention. When an accessed device has been registered as a target device in the access control policy, the behavior log table is searched in accordance with the policy to match the device with the policy (step 1111). For example, for matching the device using the record 1021 in FIG. 10, a source device and a process defined in the determination content 1013 are searched from the behavior log table to check whether or not the same ones are found in the behavior log table. Subsequently, the routine 512 determines using the type of the policy whether or not an access is permitted (step 1112), and rejects an access request if the access is not permitted (step 1113).

According to the method shown in the fourth embodiment, the behavior of each device can be estimated through behaviors of other devices and used for the access control. Therefore, the access control can be flexibly conducted among devices without previously specifying identifiers of devices to define the criteria for the access control. Also, since the behavior is indirectly monitored, it is difficult to find out which determination is made on the access control. In other words, fraudulent acts on the access control can be prevented with ease.

(Fifth Embodiment)

FIG. 14 is a flow diagram illustrating the behavior monitoring process 111 in a fifth embodiment of the present invention. After storing data received from the communication process 112 (step 1411), the behavior monitoring process 111 determines whether or not the received data shows the result of access control determination (step 1412). The access control result in each device can be the one opened by the method described in the first embodiment of the present invention. When the received data shows the result of access control determination which rejects an access, the behavior monitoring process 111 extracts the identifier of the access requesting device from the received data (step 1413), selects a record of the rejected device from the access control policy stored in the particular device, and changes the record such that no access is permitted (step 1414). If no record is found for that device, a record is added.

FIG. 15 shows an exemplary setting for the access control policy in the fifth embodiment of the present invention. A record 721 is set by the behavior monitoring process 111. A field 711 stores a device (QXZZE:83) which has been rejected an access in another device, and a determination type 712 specifies that no access is permitted ("REJECT"). When an access is issued from the device "QXZZE:33" at later time, the access can be rejected by using the contents set in the record 721, and the access control process described in FIG. 6 or 11.

According to the fifth embodiment, a target device can be set using the results of determination on other devices even without previously setting target devices subjected to the access control. In addition, by a combination with the methods described in the second to fourth embodiments of the present invention, it is possible to monitor an unknown device for behaviors and automatically select a device which presents any fraudulent behavior to control an access from the device. Further, it is possible to automatically select a device which ends up to present incorrect behaviors due to a fault or the like during the operation of the system at a target device which is associated with that device to control an access therefrom, thereby preventing the influence of malfunctions and the like from spreading over the system.

According to the respective embodiments described above, since interactions among devices are opened, the access control can be conducted by a plurality of anonymous devices, thereby making it difficult to attempt fraudulent accesses. Also, since each device can control an access to the device itself using a behavior of a certain device in a system, the access control can be flexibly conducted without previously specifying a target device. Further, since the access control policy for the device can be updated using the results of access control in other devices, each device can automatically prevent accesses from fraudulent devices without previously defining such fraudulent devices.

It should be further understood by those skilled in the art that the foregoing description has been made on embodiments of the invention and that various changes and modifications may be made in the invention without departing from the spirit of the invention and the scope of the appended claims.

What is claimed is:

1. An open information based access control method for use in a system which comprises a plurality of devices connected to each other, each of said plurality of devices including one or a plurality of processors incorporated therein, each processor having a function of executing a predetermined information process and a communication function, said method comprising the steps of:

receiving data in a first device and reading destination information from said data thereby to determine whether or not said data is one-to-one communication basis;

determining, in said first device, when said first device receives said data, whether or not said data received in said first device is broadcast to other devices, and presenting said data received in said first device from said first device to other devices when said data received in said first device is said one-to-one communication basis;

determining in a second device of said plurality of devices, to which said data is presented, whether or not said data presented in said second device is an access request to any device, and presenting said data presented in said second device to other devices when said data is an access request;

determining, in said first device, when said data received in said first device is broadcast to said other devices, whether or not said data received in said first device is data presented from another device; and determining, in said first device, if said data received in said first device is not data presented from another device other than said first device, whether or not to permit said access request to said first device based on said data received in said first device and thereafter to present said data received in said first device to said other devices; and determining, in said first device, whether or not said data received in said first device is an access request to said first device, and thereafter whether or not to permit said access request based on a predetermined condition when said first device receives data presented from another device.

2. The open information based access control method according to claim 1, further comprising the steps of:

discarding said received data when said data is determined to be not broadcast.

3. The open information based access control method according to claim 1, wherein said step of determining whether or not to permit said access request to said first device includes a step of determining whether or not to permit an access to a device that has received said data based on either an query to an authentication authority, an access control list, or an access log in said first device.

4. The open information based access control method according to claim 1, wherein said step of determining whether or not said data is broadcast to said other devices includes a substep of reading a destination of said received data thereby to determine whether or not said data is broadcast.

5. An information device which is connected to a plurality of devices, said information device having one or a plurality of processors incorporated therein, each said processor having a function of executing a predetermined information process and a communication function, wherein said processor receives data and determines whether said data is broadcast to other devices or one-to-one communication basis;

wherein said processor presents said data received in said processor from said information device to other devices when said data is said one-to-one communication basis;

wherein said processor determines, when said data received in said processor is broadcast to said other devices, whether or not said data received in said processor is data presented from any other device;

wherein said processor determines, if said data received in said processor is not data presented from another device, whether or not to permit an access request to said information device based on said data received in said processor and thereafter to present said data received in said processor to said other devices; and wherein said processor determines whether or not said data received in said processor is an access request to said information device, and thereafter whether or not to permit said access request based on a predetermined condition when said information device receives data presented from another device.

6. The information device according to claim 5, wherein said processor discards said received data when said data is determined to be not broadcast.

7. The information device according to claim 5, wherein said processor determines whether or not to permit said access request to said device by determining whether or not to permit an access to a device that has received said data based on either an query to an authentication authority, an access control list, or an access log in said device.

8. The information device according to claim 5, wherein said processor determines whether or not said data is broadcast to said other devices by reading a destination of said received data thereby to determine whether or not said data is broadcast.

* * * * *